US009885911B2

(12) United States Patent
Lee et al.

(10) Patent No.: US 9,885,911 B2
(45) Date of Patent: Feb. 6, 2018

(54) DISPLAY APPARATUS

(71) Applicant: SAMSUNG ELECTRONICS CO., LTD., Suwon-si (KR)

(72) Inventors: Sang Eun Lee, Suwon-si (KR); Dae Hee Lee, Hwaseong-si (KR); Young Chol Lee, Hwaseong-si (KR); Byoung Jin Cho, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 231 days.

(21) Appl. No.: 14/657,668

(22) Filed: Mar. 13, 2015

(65) Prior Publication Data

US 2015/0261043 A1 Sep. 17, 2015

Related U.S. Application Data

(60) Provisional application No. 61/953,165, filed on Mar. 14, 2014.

(30) Foreign Application Priority Data

May 26, 2014 (KR) .................. 10-2014-0062791

(51) Int. Cl.
*G02F 1/1335* (2006.01)
*G02F 1/1333* (2006.01)

(52) U.S. Cl.
CPC .. *G02F 1/133605* (2013.01); *G02F 1/133308* (2013.01); *G02F 1/133385* (2013.01)

(58) Field of Classification Search
CPC .............. G02F 1/133308; G02F 1/133605
See application file for complete search history.

(56) References Cited

U.S. PATENT DOCUMENTS

| 7,591,578 | B2 | 9/2009 | Chang |
| 7,834,955 | B2 * | 11/2010 | Suzuki ............... G02B 6/0031 349/67 |
| 2005/0248694 | A1 | 11/2005 | Nakayama |
| 2007/0103937 | A1 | 5/2007 | Kim |
| 2007/0139575 | A1 * | 6/2007 | Wang ............... G02F 1/133608 349/58 |
| 2007/0229995 | A1 | 10/2007 | Kawato et al. |
| 2009/0135330 | A1 | 5/2009 | Kawase et al. |

OTHER PUBLICATIONS

Communication dated Jun. 18, 2015, issued by the International Searching Authority in counterpart International Patent Application No. PCT/KR2015/002462, PCT/ISA/210.

* cited by examiner

*Primary Examiner* — Bumsuk Won
*Assistant Examiner* — Jacob R Stern
(74) *Attorney, Agent, or Firm* — Sughrue Mion, PLLC

(57) ABSTRACT

A display apparatus is provided. The display apparatus includes a liquid crystal display panel configured to display an image; a backlight unit located at the rear of the liquid crystal display panel, and including a plurality of light sources; a bottom chassis in which the backlight unit is positioned; and a reflector located in the bottom chassis, and configured to forwardly reflect light emitted from the plurality of light sources toward the liquid crystal display panel; and a reflection angle adjuster located in each corner of the reflector, and configured to reflect light emitted from the plurality of light sources in order to cause the reflected light to be incident toward corner areas of the liquid crystal display panel.

19 Claims, 6 Drawing Sheets

DISPLAY APPARATUS

CROSS-REFERENCE TO RELATED APPLICATIONS

This application claims priority from U.S. Provisional Application No. 61/953,165, filed on Mar. 14, 2014 in the U.S. Patent and Trademark Office, and Korean Patent Application No. 10-2014-0062791, filed on May 26, 2014 in the Korean Intellectual Property Office, the disclosures of which are incorporated herein by reference in their entirety.

BACKGROUND

1. Field

Apparatuses consistent with the exemplary embodiments relate to a display apparatus with improved brightness.

2. Description of the Related Art

A display apparatus is an apparatus which is capable of visually displaying data information, such as characters, figures, etc. The display apparatus includes a liquid crystal display panel and a frame on which the liquid crystal display panel is located.

Since the liquid crystal display panel is a passive optical device that cannot itself emit light, the light crystal display panel displays images using a backlight unit attached to the rear side of the liquid crystal display panel. Accordingly, the size and light efficiency of the liquid crystal display panel depends on the structure of the backlight unit so that the mechanical and optical properties of the liquid crystal display panel are greatly affected by the structure of the backlight unit.

The backlight unit can be classified into a direct type backlight unit and an edge type backlight unit according to the positions of the light sources. In the direct type backlight unit, light sources are positioned below a liquid crystal display panel so as to irradiate light directly toward the entire panel. In the edge type backlight unit, light sources are arranged along one edge on the rear side of a liquid crystal display panel.

In the direct type backlight unit, lenses which are used to disperse light emitted from the light sources may be provided above the light sources. Each lens may disperse light emitted from the corresponding light source so that the dispersed light is shown in the form of a circle from above the light source.

In the liquid crystal display panel which is generally in the shape of a quadrangle, the corner areas receive a relatively smaller amount of light than other areas since the corner areas are located at relatively long distances from light sources. Therefore, the corner areas receive a smaller amount of incident light and are therefore dark areas. Because of the dark corner areas non-uniform brightness of the display apparatus may result and picture quality may deteriorate.

SUMMARY

Therefore, it is an aspect of an exemplary embodiment to provide a display apparatus capable of acquiring uniform brightness throughout a liquid crystal display panel by ensuring a sufficient amount of light at the corner areas of the liquid crystal display panel through an improved structure of a reflector.

Additional aspects of the exemplary embodiments will be set forth in part in the description which follows and, in part, will be obvious from the description, or may be learned by practice of the disclosure.

In accordance with one aspect of an exemplary embodiment, a display apparatus includes: a liquid crystal display panel configured to display an image; a backlight unit located at the rear of the liquid crystal display panel, and including a plurality of light sources; a bottom chassis in which the backlight unit is positioned; and a reflector located in the bottom chassis, and configured to forwardly reflect light emitted from the plurality of light sources toward the liquid crystal display panel; and a reflection angle adjuster located in each corner of the reflector, and configured to reflect light emitted from the plurality of light sources in order to cause the reflected light to be incident toward corner areas of the liquid crystal display panel.

The reflection angle adjuster may be integrated with the reflector.

The reflection angle adjuster may have a flat surface which forms a predetermined angle with respect to a bottom portion of the bottom chassis.

The reflection angle adjuster may have a polygon-shaped flat surface.

The reflection angle adjuster may have a curved surface.

The reflector may include a bottom reflective portion configured to cover the bottom of a space in which the plurality of light sources are located, and a plurality of lateral reflective portions configured to cover a plurality of sides of the space in which the plurality of light sources are located.

The reflection angle adjuster may contact the bottom reflective portion and two neighboring lateral reflective portions of the plurality of lateral reflective portions.

The display apparatus may further include a top chassis configured to fix the liquid crystal display panel in a position.

The top chassis may include a front portion configured to cover a part of a front side of the liquid crystal display panel, and a lateral portion extending down from a rear side of the front portion of the top chassis.

The reflector may cover the lateral portion of the top chassis and a bottom portion of the bottom chassis.

The reflection angle adjuster may be adjacent to the bottom portion of the bottom chassis and two neighboring lateral portions of the top chassis.

The reflection angle adjuster may have a polygon-shaped flat surface that is adjacent to a bottom portion of the bottom chassis and two neighboring lateral portions of the top chassis.

The reflection angle adjuster may have a triangle-shaped flat surface that is adjacent to a bottom portion of the bottom chassis and two neighboring lateral portions of the top chassis.

The reflection angle adjuster may be formed by bending a part of the reflector.

The reflection angle adjuster may be formed to have a curved shape, and the curved shape may be formed by a part of the reflector when the reflector is located in the bottom chassis.

In accordance with another aspect of an exemplary embodiment, a display apparatus includes: a liquid crystal display panel configured to display an image; a bottom chassis located at the rear of the liquid crystal display panel; a light source located in the bottom chassis; a top chassis comprising a front portion configured to cover a part of the liquid crystal display panel, and a lateral portion extending down from a rear side of the front portion of the top chassis; a reflector configured to cover a bottom portion of the bottom chassis and the lateral portion of the top chassis; and a reflection angle adjuster is provided in each corner of a space and is formed by the bottom portion of the bottom chassis and the lateral portion of the top chassis by bending a part of the reflector so that light emitted from the light source is reflected to corner areas of the liquid crystal display panel.

The reflection angle adjuster may be integrated with the reflector.

The reflection angle adjuster may have a polygon-shaped flat surface.

The reflection angle adjuster may have a curved surface.

The reflection angle adjuster may be adjacent to the bottom portion of the bottom chassis and two neighboring lateral portions of the top chassis.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
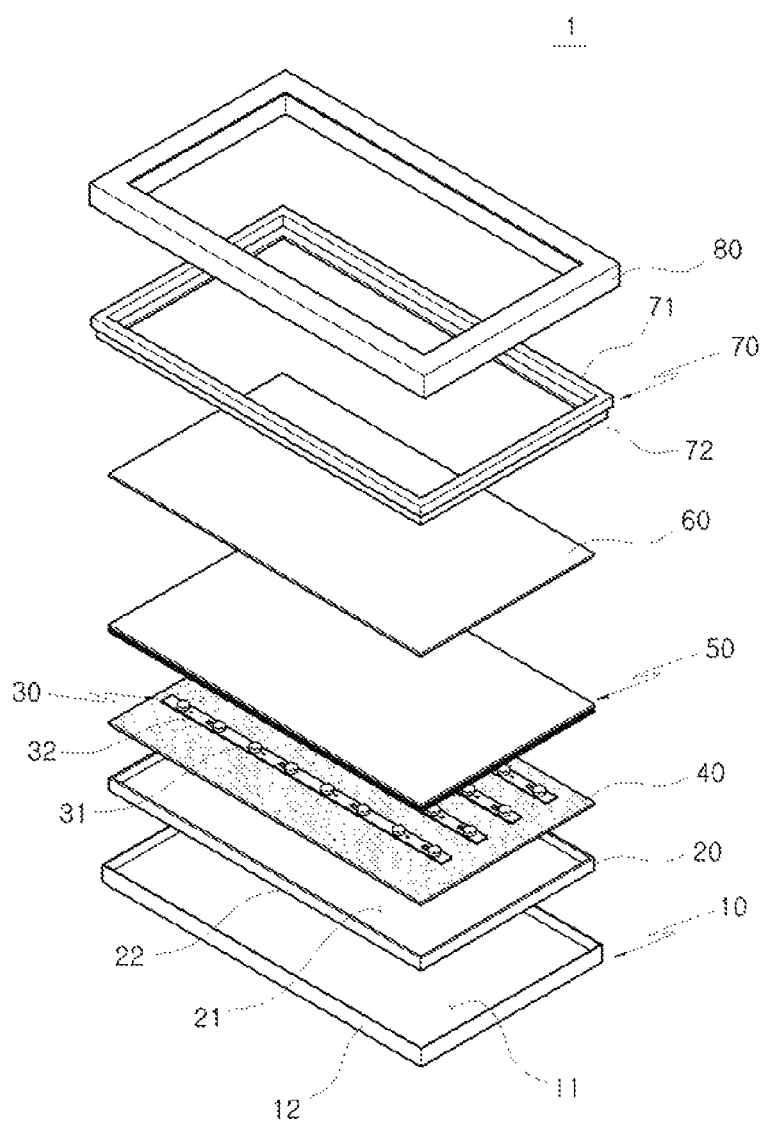
FIG. 1 is an exploded perspective view of a display apparatus according to an exemplary embodiment.

Reference will now be made in detail to the exemplary embodiments, examples of which are illustrated in the accompanying drawings, wherein like reference numerals refer to like elements throughout.

Hereinafter, a display apparatus according to an exemplary embodiment will be described in detail with reference to the appended drawings.

Figure 2:
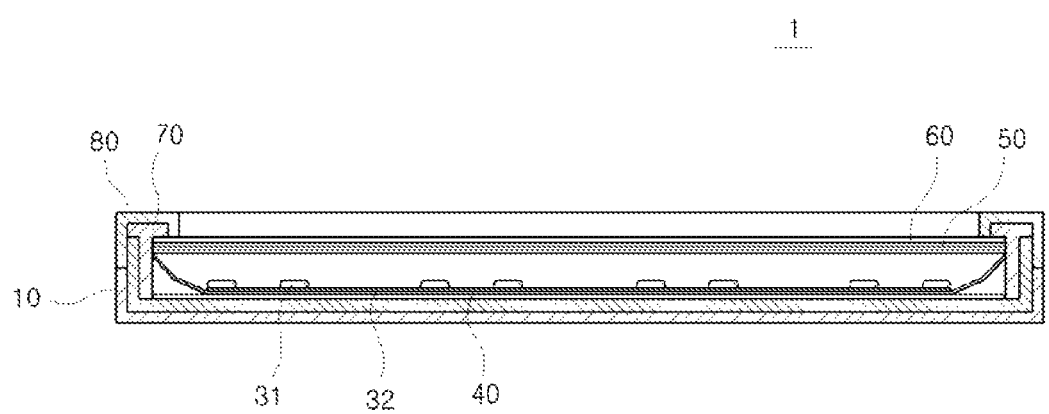
FIG. 2 is a cross-sectional view of a display apparatus according to an exemplary embodiment.

FIG. 1 is an exploded perspective view of a display apparatus according to an exemplary embodiment, and FIG. 2 is a cross-sectional view of a display apparatus according to an exemplary embodiment.

Referring to FIGS. 1 and 2, a display apparatus 1 according to an exemplary embodiment may include a rear cover 10, a bottom chassis 20, a backlight unit 30, a reflector 40, a plurality of optical sheets 50, a liquid crystal display panel 60, a top chassis 70, and a front cover 80. The backlight unit 30, the reflector 40, and the plurality of optical sheets 50 may be rested in the bottom chassis 20. The bottom chassis 20 may be positioned between the rear cover 10 and the front cover 80.

The rear cover 10 and the front cover 80 may form the external appearance of the display apparatus 1. The rear cover 10 and the front cover 80 may be made of a plastic resin material. The front cover 80 may include various ornaments (not shown) in order to make the display device 1 esthetically pleasing to a user. The rear cover 10 may include a heat dissipation member (not shown) to release heat generated from the display apparatus 1. The rear cover 10 may include a bottom portion 11 on which the backlight unit 30 is placed, and a lateral portion 12 extending upward from the circumference of the bottom portion 11.

The reflector 40 may be placed in the inside of the bottom chassis 20. The reflector 40 may be formed with a reflective sheet. A plurality of light sources 31 of the backlight unit 30 may be exposed on the front side of the reflector 40. Light emitted from the backlight unit 30 may be reflected from the surface of the reflector 40, and forwardly incident toward the plurality of optical sheets 50 and the liquid crystal display panel 60.

The plurality of optical sheets 50 may be positioned in front of the backlight unit 30, and the liquid crystal display panel 60 may be positioned in front of the plurality of optical sheets 50. The liquid crystal display panel 60 may be fixed by the top chassis 70. The top chassis 70 may include a front portion 71 to cover a part of the front side of the liquid crystal display panel 60, and a lateral portion 72 extending down from the rear side of the front portion 71.

The backlight unit 30 may be positioned at the rear of the liquid crystal display panel 60. The plurality of optical sheets 50 may be interposed between the backlight unit 30 and the liquid crystal display panel 60. The backlight unit 30 may include the plurality of light sources 31 and a Printed Circuit Board (PCB) 32. The light sources 31 may be packaged on the front side of the PCB 32. The light sources 31 may be a plurality of light emitting diodes (LEDs) that are point light sources. The light sources 31 may be spaced apart at regular intervals.

Each light source 31 may include a lens to disperse light which is emitted from the light source 31. The lens may have an arbitrary shape so as to laterally disperse light, which is emitted forward from the light source 31, in the range of a luminous view angle depending on the shape of the lens so that the light can be uniformly incident towards the entire area of the liquid crystal display panel 60.

The reflector 40 may be made of a highly reflective material, and configured to cover the bottom and sides of a space in which the light sources 31 are located. If the lateral portion 72 of the top chassis 70 is positioned in the inside of the bottom chassis 20, the reflector 40 may be configured to cover the lateral portion 72 of the top chassis 70 and a bottom portion 21 of the bottom chassis 20. If the lateral portion 72 of the top chassis 70 is positioned outside of the bottom chassis 20, the reflector 40 may be configured to cover the bottom portion 21 and the lateral portion 22 of the bottom chassis 20.

According to an exemplary embodiment, the lateral portion 72 of the top chassis 70 may be placed in the inside of the bottom chassis 20. In this case, the reflector 40 may cover the lateral portion 72 of the top chassis 70 and the bottom portion 21 of the bottom chassis 20. Light incident toward the lateral portion 72 of the top chassis 70 or the bottom portion 21 of the bottom chassis 20 may be reflected from the surface of the reflector 40, and then incident toward the liquid crystal display panel 60.

Hereinafter, the case in which the lateral portion 72 of the top chassis 70 is placed in the inside of the bottom chassis 20 will be described. The reflector 40 may cover the inside part of the lateral portion 72 of the top chassis 70 and the inside part of the bottom portion 21 of the bottom chassis 20. In the reflector 40, a portion that covers the lateral portion 72 of the top chassis 70 is referred to as a lateral reflective portion 42, and a portion that covers the bottom portion 21 of the bottom chassis 20 is referred to as a bottom reflective portion 43.

The light sources 31 may be exposed upward from the reflector 40 through holes (not shown) formed in the reflector 40. Light which is emitted from the light sources 31 may be incident directly and straight toward the liquid crystal display panel 60, or may be reflected by the reflector 40 and then incident toward the liquid crystal display panel 60.

The plurality of optical sheets 50 may be placed in front of the reflector 40. The optical sheets 50 may include a diffusion sheet, a prism sheet, a protection sheet, and a reflection-polarization sheet. However, these are merely examples, and the optical sheets 50 may include other types of sheets and different combinations of sheets.

The diffusion sheet may diffuse light emitted from the light sources 31. The prism sheet may be stacked on the diffusion sheet, and focus light diffused by the diffusion sheet, thereby improving front brightness. The reflection-polarization sheet may be stacked on the protection sheet, and reflect and polarize light focused by the prism sheet such that the light has a polarization axis that is transmitted through the liquid crystal display panel 60. The protection sheet may be interposed between the prism sheet and the reflection-polarization sheet in order to prevent white spots by the prism sheet.

The plurality of optical sheets 50 may improve the optical characteristics of light emitted from the backlight unit 30, which leads to improved brightness of the display apparatus 1.

The liquid crystal display panel 60 may control the alignment of liquid crystal layers in order to produce an image. Since the liquid crystal display panel 60 cannot itself emit light, the liquid crystal display panel 60 may receive light from the backlight unit 30 to display an image.

The top chassis 70 may be placed on the liquid crystal display panel 60. The top chassis 70 may press the edge portion of the liquid crystal display panel 60 toward the bottom chassis 20 to thus fix the liquid crystal display panel 60.

The front cover 80 may be placed on the top chassis 70, thus forming the front appearance of the display apparatus 1. The front cover 80 may also include ornaments in order to make the display apparatus esthetically pleasing to a user. The front cover 80 may also be subject to surface processing, such as etching, which makes the display apparatus 1 feel more luxurious to a user.

Figure 3:
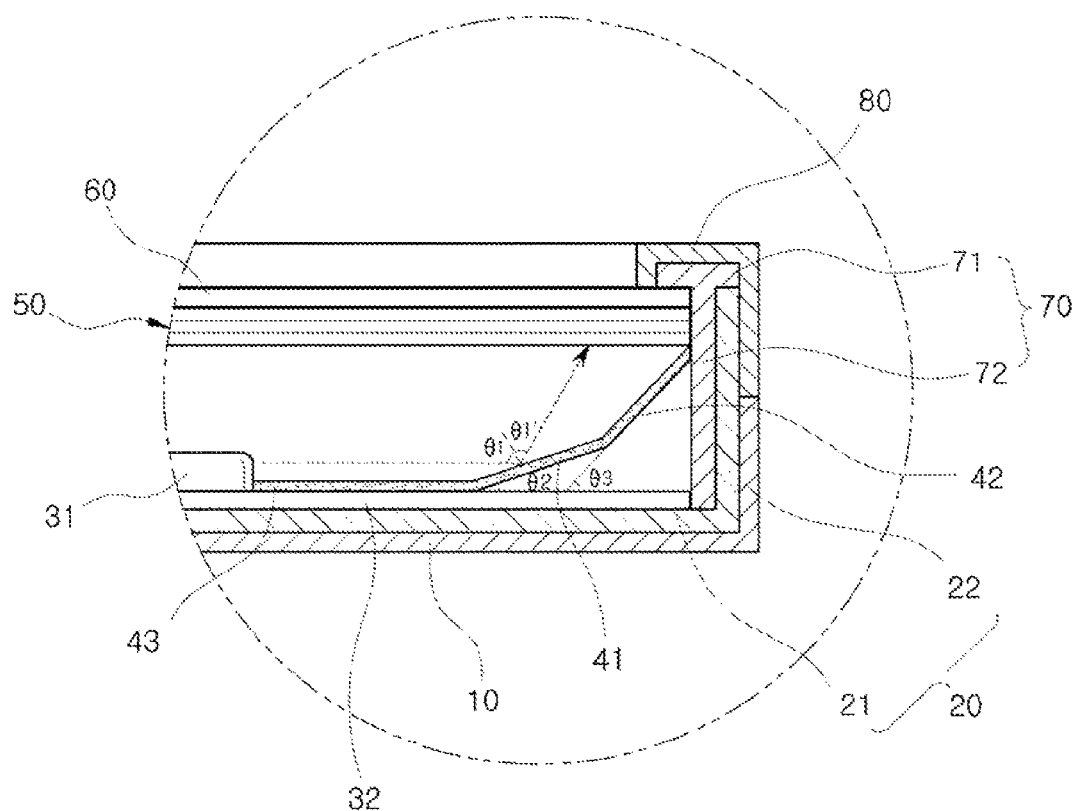
FIG. 3 is a cross-sectional view showing a part of a display apparatus according to an exemplary embodiment.
Figure 4:
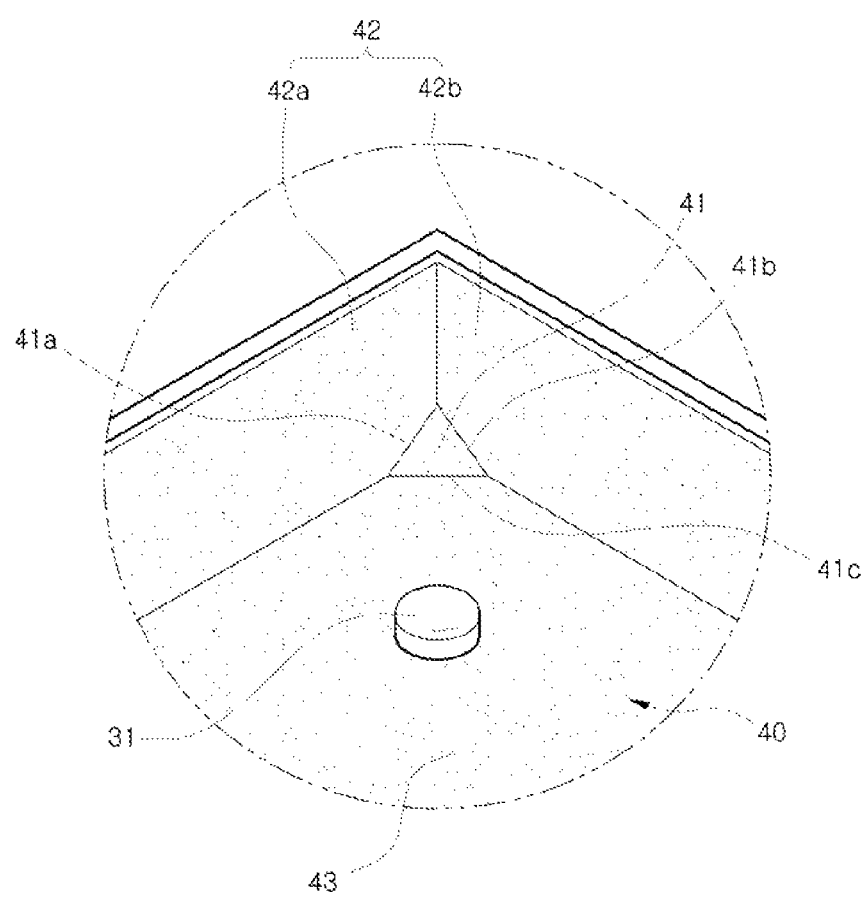
FIG. 4 is a perspective view showing a part of a reflector of a display apparatus according to an exemplary embodiment.

FIG. 3 is a cross-sectional view showing a part of the display apparatus 1 according to an exemplary embodiment, and FIG. 4 is a perspective view showing a part of the reflector 40 of the display apparatus 1 according to an exemplary embodiment.

Referring to FIGS. 3 and 4, a reflection angle adjuster 41 may be provided at each corner of the reflector 40 of the display apparatus 1. The reflection angle adjuster 41 may have a polygon-shaped flat surface that contacts the bottom reflective portion 43 and two neighboring lateral reflective portions 42a and 42b. The reflection angle adjuster 41 may reflect light emitted from the light sources 31 toward the corner areas of the liquid crystal display panel 60. Thereby, the reflection angle adjuster 41 can prevent a dark area from being generated in the corner areas of the liquid crystal display panel 60.

In a direct type backlight unit, several tens to hundreds of LED light sources may be used in order to maintain a uniform surface light source. However, such a large number of LED light sources may result in an increase in power consumption and an increase in heat dissipation costs. However, if a small number of LED light sources are used, a liquid crystal display panel cannot receive a sufficient amount of light at the corner areas, which may result in the generation of dark areas which appear darker than other areas. In this case, the picture quality of an image that is displayed on the liquid crystal display panel may deteriorate due to the dark area generated in the corner areas of the liquid crystal display panel.

According to the current exemplary embodiment, the reflection angle adjuster 41 is provided in each corner of the reflector 40 so that a uniform surface light source can be implemented without generating any dark areas in the corner areas of the liquid crystal display panel 60 though the backlight unit 30 (see FIG. 1) which includes an appropriate number of light sources. The reflection angle adjuster 41 may be integrated with the reflector 40.

Light emitted from the light sources 31 toward the reflection angle adjuster 41 may be reflected to be incident toward the corner area of the liquid crystal display panel 60 so that a sufficient amount of light can be supplied to the corner area of the liquid crystal display panel 60. As such, by supplying a uniform amount of light to the entire area of the liquid crystal display panel 60, the picture quality of the display apparatus 1 can be improved.

The reflection angle adjuster 41 may be formed by bending a part of the reflector 40. For example, the reflection angle adjuster 41 may be formed in a shape of a triangle, wherein two sides 41a and 41b of the reflection angle adjuster 41 respectively contact two neighboring lateral reflection portions 42a and 42b of the reflector 40, and the remaining side 41c of the reflection angle adjuster 41 contacts the bottom reflective portion 43 of the reflector 40. However, the reflection angle adjuster 41 is not limited to the shape of a triangle, and may be implemented as a flat surface with an arbitrary shape.

The reflection angle adjuster 41 may have a predetermined angle θ2 with respect to the bottom portion 21 of the bottom chassis 20 in order to reflect light to the corner area of the liquid crystal display panel 60. More specifically, as shown in FIG. 3, the reflection angle adjuster 41 may have a predetermined angle θ2 with respect to the inside part of the bottom portion 21 of the bottom chassis 20. The predetermined angle θ2 between the reflection angle adjuster 41 and the inside part of the bottom portion 21 of the bottom chassis 20 may be smaller than 90°.

For example, the reflection angle adjuster 41 may have an angle of 20° to 25° with respect to the inside part of the bottom portion 21 of the bottom chassis 20. However, an angle between the reflection angle adjuster 41 and the inside part of the bottom portion 21 of the bottom chassis 20 is not limited to this to this example. The angle between the reflection angle adjuster 41 and the inside part of the bottom portion 21 of the bottom chassis 20 may vary depending on an environment of the display apparatus 1, such as a distance between the light sources 31 and the liquid crystal display panel 60.

The lateral reflective portion 42 of the reflector 40 extending upward from the reflection angle adjuster 41 may have a predetermined angle θ3 with respect to the bottom portion 21 of the bottom chassis 20. The angle θ3 between the lateral reflective portion 42 of the reflector 40 and the bottom portion 21 of the bottom chassis 20 may be greater than the angle θ2 between the reflection angle adjuster 41 and the bottom portion 21 of the bottom chassis 20.

The bottom reflective portion 43 may cover a majority of the bottom portion 21 of the bottom chassis 20, and the lateral reflective portion 42 may cover a majority of the lateral portion 72 of the top chassis 70. Since the reflection angle adjuster 41 is located in the corner formed by the bottom portion 21 of the bottom chassis 20 and the lateral portion 72 of the top chassis 70, a part of the bottom portion 21 of the bottom chassis 20 and a part of the lateral portion 72 of the top chassis 70 may be covered. As such, the bottom and sides of a space in which the light sources 31 are located may be covered by the reflector 40 so that light emitted from the light sources 31 can be uniformly incident toward the entire area of the liquid crystal display panel 60.

As seen in the cross-sectional view of FIG. 3, the reflection angle adjuster 41 may be inclined to have an angle θ2 with respect to the bottom reflective portion 43, and the lateral reflective portion 42 to which the reflection angle adjuster 41 connects may be inclined to have an angle θ3 with respect to the bottom reflective portion 43, wherein θ3 is greater than θ2. The reflector 40 may be bent twice from the bottom reflective portion 43 to extend forward.

The above description relates to the case in which the reflection angle adjuster 41 is provided for each corner of the reflector 40, however, a plurality of reflection angle adjusters 41 may be provided according to an environment of the display apparatus 1 so that a sufficient amount of light can be transferred to the corner areas of the liquid crystal display panel 60. For example, four reflection angle adjusters 41 can be include or less than four reflection angle adjusters 41 can be included in the display apparatus 1. Also, the shape of the reflection angle adjuster 41 is also not limited to the above-described example, and may be an arbitrary shape. The angle of the reflection angle adjuster 41 with respect to the bottom portion 21 of the bottom chassis 20, the size of the reflection angle adjuster 41, and the shape of the reflection angle adjuster 41 may vary according to an environment of the display apparatus 1 such as a distance between the light sources 31 and the liquid crystal display panel 60.

Light emitted from the light sources 31 to the reflection angle adjuster 41 may be reflected from the surface of the reflection angle adjuster 41, and forwardly incident toward the liquid crystal display panel 60. Light incident toward the reflection angle adjuster 41 with an incident angle θ1 may be reflected at a reflection angle θ1', and incident toward the corner area of the liquid crystal display panel 60.

An angle of the light which is incident toward the corner of the reflector 40 may be changed by the reflection angle adjuster 41, and incident toward the corner area of the liquid crystal panel 60, so that a sufficient amount of light can be transferred to the corner area of the liquid crystal display panel 60. Since a sufficient amount of light is transferred to each corner area of the liquid crystal display panel 60, it is possible to prevent dark areas from being generated in the corner areas of the liquid crystal display panel 60. As such, since a uniform amount of light is transferred to the entire area of the liquid crystal display panel 60, the display apparatus 1 can achieve uniform picture quality.

The above description describes a case in which the reflection angle adjuster 41 is formed by cutting and bending a part of the reflector 40. However, it is also possible that the reflection angle adjuster 41 is formed by placing a material, which is the same material as the reflector 40, in each corner formed by the bottom portion 21 of the bottom chassis 20 and the lateral portion 72 of the top chassis 70.

Figure 5:
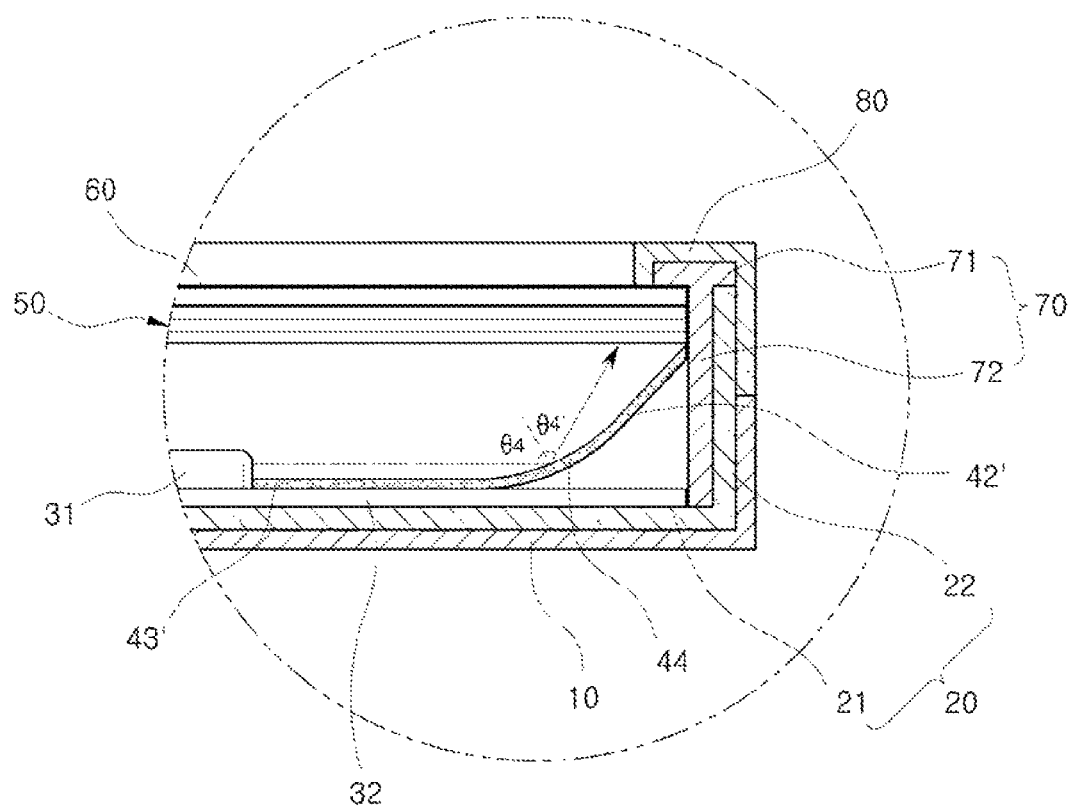
FIG. 5 is a cross-sectional view showing a part of a display apparatus according to another exemplary embodiment.
Figure 6:
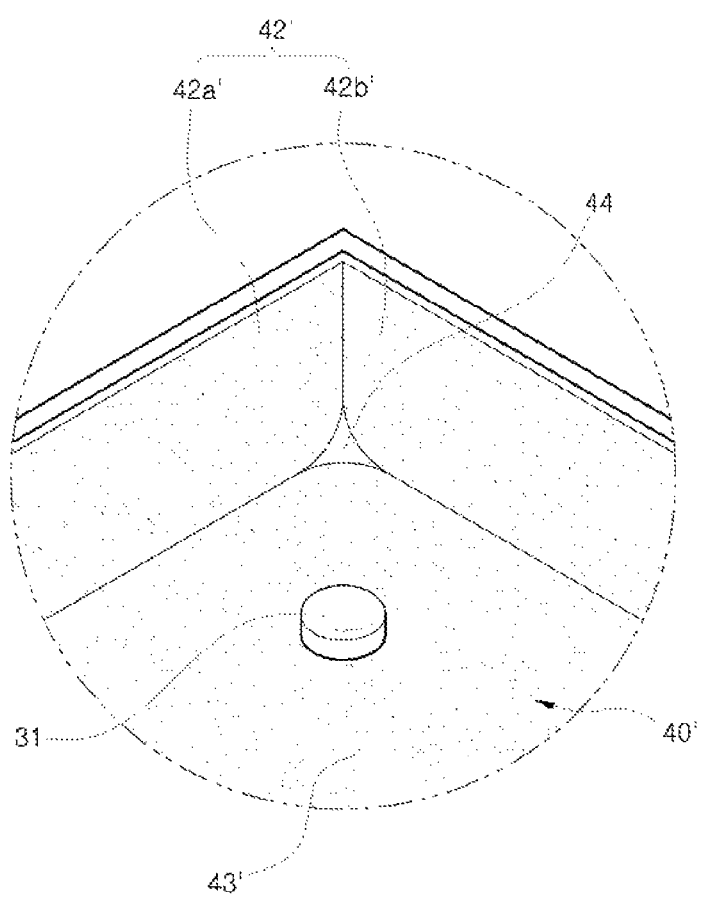
FIG. 6 is a perspective view showing a part of a reflector of a display apparatus according to another exemplary embodiment.

FIG. 5 is a cross-sectional view showing a part of a display apparatus according to another exemplary embodiment, and FIG. 6 is a perspective view showing a part of a reflector of a display apparatus according to another exemplary embodiment.

Referring to FIGS. 5 and 6, a reflector 40' of a display apparatus 1 according to another exemplary embodiment may cover the bottom portion 21 of the bottom chassis 20 and the lateral portion 72 of the top chassis 70, and a reflection angle adjuster 44 may be formed in each corner.

The reflector 40' may include a bottom reflective portion 43' to cover a majority of the bottom portion 21 of the bottom chassis 20, and a lateral reflective portion 42' to cover a majority of the lateral portion 72 of the top chassis 70. The reflection angle adjuster 44 may be positioned in each corner formed by the bottom portion 21 of the bottom chassis 20 and the lateral portion 72 of the top chassis 70 to reflect light emitted from the light sources 31.

The reflection angle adjuster 44 may have a curved surface with a predetermined curvature. The shape of the curvature can be determined as desired by the manufacturer of the display apparatus and can be adjusted according to a desired amount of light reflection. The reflection angle adjuster 44 may form a curved surface with respect to the bottom reflective portion 43' and two neighboring lateral reflective portions 42a' and 42b'.

The reflection angle adjuster 44 may be configured such that light emitted from the light sources 31 can be reflected from the surface of the reflection angle adjuster 44, and incident toward the corner area of the liquid crystal display panel 60. Due to the structure of the reflector 40 having the reflection angle adjuster 44 in each corner, it is possible to prevent dark areas from being generated in the corner areas of the liquid crystal display panel 60.

Light emitted from the light sources 31 to the reflection angle adjuster 44 may be reflected from the surface of the reflection angle adjuster 44, and forwardly incident toward the liquid crystal display panel 60. Light incident toward the reflection angle adjuster 44 with an incident angle θ4 may be reflected at a reflection angle θ4', and incident toward the corner area of the liquid crystal display panel 60.

If the reflector 40' is a reflection sheet, the reflection angle adjuster 44 may be formed without cutting a part of each corner of the reflector 40 such that the corner of the reflector 40 forms a curved surface smoothly connected to the bottom reflective portion 43' and the lateral reflective portion 42' when the reflector 40 is rested in the bottom chassis 20. The curvature and size of the reflection angle adjuster 44 may vary according to an environment of the display apparatus 1, such as a distance between the light sources 31 and the liquid crystal display panel 60.

In the display apparatus 1 according to the current exemplary embodiment, the remaining configurations, except the reflection angle adjuster 44 which has a curved surface, may be the same as or similar to those of the display apparatus 1 according to the previous exemplary embodiment.

The above description relates to the case in which the reflector 40 or 40' is located in a space formed by the bottom portion 21 of the bottom chassis 20 and the lateral portion 72 of the top chassis 70, however, a space in which the reflector 40 or 40' is located is not limited to this exemplary embodiment. The reflector 40 or 40' may be located in an inside area surrounding a space in which the light sources 31 are located so that light emitted from the light sources 31 can be reflected and forwardly incident toward the liquid crystal display panel 60. The reflection angle adjuster 44 may be positioned in each corner of the space in which the light sources 31 are located. Light emitted from the light sources 31 may be reflected from the reflection angle adjuster 44, and incident toward the corner area of the liquid crystal display panel 60. Due to the reflection angle adjuster 44, a sufficient amount of light can be ensured in each corner area of the liquid crystal display panel 60 which prevents dark areas from being generated.

The display apparatus according to the exemplary embodiments can be used in a television or other devices which require a display apparatus.

The display apparatus 1 according to the exemplary embodiments have a direct type backlight unit which can achieve uniform brightness over the entire area of the liquid crystal display panel 60 through the improved structure of the reflector 40. By implementing a surface light source with uniform brightness, the picture quality of the display apparatus 1 can be improved.

According to the exemplary embodiments, by preventing dark areas from being generated in the corner areas of a display apparatus through an improved structure of the reflector, which thus improves the brightness of the display apparatus, a high quality of image can be acquired.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A display apparatus comprising:
   a liquid crystal display panel configured to display an image;
   a backlight unit located at the rear of the liquid crystal display panel, and comprising a plurality of light sources;
   a bottom chassis in which the backlight unit is positioned;
   a reflector located in the bottom chassis, configured to forwardly reflect light emitted from the plurality of light sources toward the liquid crystal display panel, and including a bottom reflective portion configured to cover a bottom of a space in which the plurality of light sources are located, and a plurality of lateral reflective portions configured to cover a plurality of sides of the space in which the plurality of light sources are located; and
   a reflection angle adjuster located in each corner of the reflector and disposed outside of a light source arranged at an outermost periphery of the plurality of light sources in a direction in which the plurality of lateral reflective portions are disposed and in contact with the bottom reflective portion and two neighboring lateral reflective portions of the plurality of lateral reflective portions, and configured to reflect light emitted from the plurality of light sources in order to cause the reflected light to be incident toward corner areas of the liquid crystal display panel.

2. The display apparatus according to claim 1, wherein the reflection angle adjuster is integrated with the reflector.

3. The display apparatus according to claim 1, wherein the reflection angle adjuster has a flat surface which forms a predetermined angle with respect to a bottom portion of the bottom chassis.

4. The display apparatus according to claim 3, wherein the reflection angle adjuster has a polygon-shaped flat surface.

5. The display apparatus according to claim 1, wherein the reflection angle adjuster has a curved surface.

6. The display apparatus according to claim 1, further comprising a top chassis configured to fix the liquid crystal display panel in a position.

7. The display apparatus according to claim 6, wherein the top chassis comprises a front portion configured to cover a part of a front side of the liquid crystal display panel, and a lateral portion which extends down from a rear side of the front portion of the top chassis.

8. The display apparatus according to claim 7, wherein the reflector covers the lateral portion of the top chassis and a bottom portion of the bottom chassis.

9. The display apparatus according to claim 7, wherein the reflection angle adjuster is adjacent to a bottom portion of the bottom chassis and two neighboring lateral portions of the top chassis.

10. The display apparatus according to claim 7, wherein the reflection angle adjuster has a polygon-shaped flat surface that is adjacent to a bottom portion of the bottom chassis and two neighboring lateral portions of the top chassis.

11. The display apparatus according to claim 7, wherein the reflection angle adjuster has a triangle-shaped flat surface that is adjacent to a bottom portion of the bottom chassis and two neighboring lateral portions of the top chassis.

12. The display apparatus according to claim 1, wherein the reflection angle adjuster is formed by bending a part of the reflector.

13. The display apparatus according to claim 1, wherein the reflection angle adjuster is formed to have a curved shape, and the curved shape is formed by a part of the reflector when the reflector is located in the bottom chassis.

14. A display apparatus comprising:
    a liquid crystal display panel configured to display an image;
    a bottom chassis located at the rear of the liquid crystal display panel;
    a plurality of light sources located in the bottom chassis;
    a top chassis comprising a front portion configured to cover a part of the liquid crystal display panel, and a lateral portion configured to extend down from a rear side of the front portion of the top chassis; a reflector configured to cover a bottom portion of the bottom chassis and the lateral portion of the top chassis; and
    a reflection angle adjuster which is located in each corner of a space and is formed by the bottom portion of the bottom chassis and the lateral portion of the top chassis by bending a part of the reflector so that light emitted from the plurality of light sources is reflected to corner areas of the liquid crystal display panel and is disposed outside of a light source arranged at an outermost periphery of the plurality of light sources in a direction in which the lateral portion of the top chassis is disposed,
    wherein the bottom chassis comprises a bottom portion and four lateral portions, the bottom portion being arranged in parallel with the liquid crystal display panel, and each of the four lateral portions being arranged to extend perpendicularly from a respective side of the bottom portion toward the liquid crystal display panel.

15. The display apparatus according to claim 14, wherein the reflection angle adjuster is integrated with the reflector.

16. The display apparatus according to claim 14, wherein the reflection angle adjuster has a polygon-shaped flat surface.

17. The display apparatus according to claim 14, wherein the reflection angle adjuster has a curved surface.

18. The display apparatus according to claim 14, wherein the reflection angle adjuster is adjacent to the bottom portion of the bottom chassis and two neighboring lateral portions of the top chassis.

19. A display apparatus comprising:
    a bottom chassis comprising a bottom surface and four side surfaces that extend perpendicularly from respective sides of the bottom surface;
    a reflector located on the bottom surface and one of the four side surfaces of the bottom chassis;

a plurality of light sources in the bottom chassis; and
a reflection angle adjuster located in the corners of the bottom chassis and disposed outside of a light source arranged at an outermost periphery of the plurality of light sources in a direction in which the lateral portion of the top chassis is disposed which is configured to reflect light from the plurality of light sources.

\* \* \* \* \*